: US011754751B2

(12) United States Patent
O'Nagy

(10) Patent No.: US 11,754,751 B2
(45) Date of Patent: Sep. 12, 2023

(54) DIRECTED FREEZING PRECIPITATION DETECTION DEVICE AND METHOD

(71) Applicant: Luxembourg Institute of Science and Technology (LIST), Esch-sur-Alzette (LU)

(72) Inventor: Oliver O'Nagy, Igel-Liersberg (DE)

(73) Assignee: LUXEMBOURG INSTITUTE OF SCIENCE AND TECHNOLOGY (LIST), Esch-sur-Alzette (LU)

(*) Notice: Subject to any disclaimer, the term of this patent is extended or adjusted under 35 U.S.C. 154(b) by 73 days.

(21) Appl. No.: 16/956,455

(22) PCT Filed: Dec. 18, 2018

(86) PCT No.: PCT/EP2018/085678
§ 371 (c)(1),
(2) Date: Jun. 19, 2020

(87) PCT Pub. No.: WO2019/121805
PCT Pub. Date: Jun. 27, 2019

(65) Prior Publication Data
US 2021/0349239 A1    Nov. 11, 2021

(30) Foreign Application Priority Data

Dec. 22, 2017 (LU) .................................. LU100589

(51) Int. Cl.
*G01W 1/14* (2006.01)
*G01W 1/06* (2006.01)
(52) U.S. Cl.
CPC ................ *G01W 1/14* (2013.01); *G01W 1/06* (2013.01)
(58) Field of Classification Search
CPC .......... G01W 1/14; G01W 1/06; G01N 15/06; G01N 15/0612; G01N 15/0806;
(Continued)

(56) References Cited

U.S. PATENT DOCUMENTS 8,800,362 B2 * 8/2014 Bartonek ................ G01W 1/14
73/170.21

FOREIGN PATENT DOCUMENTS

CN    106526711 A *  3/2017
CN    106526711 A     3/2017
(Continued)

OTHER PUBLICATIONS

International Search Report issued in connection with PCT Application No. PCT/EP2018/085678 dated Mar. 14, 2019.

*Primary Examiner* — John Fitzgerald
*Assistant Examiner* — Truong D Phan
(74) *Attorney, Agent, or Firm* — NIXON & VANDERHYE

(57) ABSTRACT

The present application relates to a freezing precipitation detection device (10) comprising at least one first wetness detection means (1) in thermo-conducting contact with the upper (3A) surface of a sloped thermo-conducting sheet (3), at least one second wetness detection means (2) in thermo-conducting contact with the lower (3B) surface of said sloped thermo-conducting sheet (3), at least one surface temperature detection means (4) in thermo-conducting contact with said sloped thermo-conducting sheet (3), at least one processor (5) configured to receive at least one first signal (11;11A,11B,11C) from the first wetness detection means (1) and from the second wetness detection means (2) and from the surface temperature detection means (4), analyzing said first signal (11;11A,11B,11C) and determining the presence or the absence of a freezing precipitation on the surface of the sloped thermo-conducting sheet (3), at least one first apparatus (7) for external power relay receiving at least a second signal (12) from the processor (5), said signal being indicative of a recommended action by said first apparatus (7), said action being either permitting to provide power or not to provide power to at least one third apparatus (Continued)

(8), at least one second apparatus (6) for power supply being connected to said processor (5) and also to said first apparatus (7), wherein said second apparatus (6) for power supply is not actively heating said thermo-conducting sheet (3), said first apparatus (7) permitting to provide power to said third apparatus (8) only when said surface temperature detection means (4) detects a temperature less or equal to a determined threshold and the first and second wetness detection means (1;2) detect the presence of a freezing precipitation. The present invention relates also to uses and a method for detecting a freezing precipitation.

11 Claims, 9 Drawing Sheets

(58) Field of Classification Search
CPC ...... G01N 2015/0846; G01N 2021/558; F21V 29/90; B60Q 1/0017; B60Q 1/00; F21S 43/14; F21S 43/145
See application file for complete search history.

(56) References Cited

FOREIGN PATENT DOCUMENTS

| | | | | |
|---|---|---|---|---|
| JP | H07151865 A | * | 6/1995 | |
| JP | H07151865 A | | 6/1995 | |

* cited by examiner

DIRECTED FREEZING PRECIPITATION DETECTION DEVICE AND METHOD

CROSS-REFERENCE TO RELATED APPLICATIONS

This is a 35 U.S.C. 371 National Stage Patent Application of International Application No. PCT/EP2018/085678, filed Dec. 18, 2018, which claims priority to Luxembourg application LU100589, filed Dec. 22, 2017, each of which is hereby incorporated by reference in its entirety.

BACKGROUND

The present invention relates to the field of meteorology, namely the detection of a directed freezing precipitation at the time when it occurs with a minimum energy requirement (no active heating required for the sensing device).

JP 07151865 relates to a snowfall detecting system.

CN 106526711 relates to a rain, snow, dew and frost monitor which comprises a monitor shell.

U.S. Pat. No. 8,800,362 relates to a method for detecting precipitation.

The closest state of the art is JP 07151865 because it relates to the same field of monitoring snowfall and has the most technical features in common with the present invention.

The difference between the present invention and the closest prior art is:
- At least one second wetness detection means in thermo-conducting contact with the lower surface of said sloped thermo-conducting sheet,
- at least one processor configured to receive at least one first signal from the first wetness detection means and from the second wetness detection means and from the surface detection means,
- said first apparatus (7) permitting to provide power to said third apparatus (8) only when a temperature less or equal to a determined threshold is detected by said surface temperature detection means (4) and the presence of a freezing precipitation is detected by the first and second wetness detection means (1;2)—said second apparatus (6) for power supply is not actively heating of sensing devices said thermo-conducting sheet (3), temperature detection means (4), wetness detection means (1) and wetness detection means (2).

The technical effect of the difference is to save electrical energy when there is no freezing precipitation (see table 1 and table 2). An additional technical effect of the detection of the inclusion of signals from a temperature sensor and two wetness detection means, one mounted on the upper surface and one at the lower surface of the sloped thermo-conducting sheet where it is protected from direct precipitation, is that the processor can analyse the three input signals and distinguish between direct and indirect precipitation and freezing or non-freezing conditions. In JP 07151865 power is supplied to the heater depending only on the measured temperature, the state of the precipitation is however not considered.

The objective technical problem to be solved by the present invention may therefore be regarded as modifying the device of JP 07151865 such that the signal for supplying power is not given when it is not necessary (i.e. not snowing, although it is cold) in order to save energy.

The solution to the problem is to use a second apparatus (6) for power supply wherein said second apparatus (6) is not actively heating the thermo-conducting sheet (3), whereon the first (1) and second wetness detection (2) means as well as the surface temperature detection means (4) are located.

Even if a person skilled in the art would be led to combine the prior art documents, the resulting device would be earlier out of energy than the device of the present invention, because the person skilled in the art would be led to use an active heating of the sensors taught in D1 and D2, while in the present invention there is no active heating of the sensing devices (3), (1), (2) and (4).

The problem may also be regarded as reducing drastically the energy consumption in remote weather stations during freezing time, which most of the time include a dry period (i.e. no directed precipitation: no rain, no snow, no hail) and a wet precipitation period (i.e. a directed precipitation: rain, snow, hail), by operating an apparatus (6) (i.e. a battery) only if it's really necessary for the good operation of a third apparatus (8) (e.g. a rain gauge), i.e. increasing considerably the life time of the second apparatus (6).

During a period of non-precipitation (dry period), the device of the present invention will not switch on a heater (i.e. save energy) and during a period of freezing precipitation (wet period), the device of the present invention will switch on a heater (i.e. require energy), see FIG. 4.

The known devices of the state of the art using a battery as an electrical power source would continue to work during a dry period (which is loss of energy) and therefore consume electrical power until the battery is empty of power (typically in less than 24 hours) if they are in the remote area without any person who could disconnect the battery if not required.

In case of a wet or fluid or liquid precipitation (i.e. rain or a mix snow-rain) at a temperature equal to or above 4° C. for example, the present invention would save electrical power (see table 1 and FIG. 4), while again a device of the prior art would continue to consume electrical power until the battery would be empty (typically in less than 24 hours).

The closest state of the art CN 106526711 can detect the presence of snow on the surface of a sloped sheet, but without correlating it to the precipitation process itself, while the present invention is able to detect freezing precipitation at the time when it occurs and also after it stops (i.e. a sufficiently short time after the precipitation stopped) permitting to increase the life duration of a battery. All existing inventions known so far are focussing on the presence of snow and not on the event of a freezing rain or snowing.

The state of the art does also not teach the use of an electrical heating system for rain gauges. The requirement of heating for rain gauges of the present invention occurs only, when there is precipitation ongoing until a short time after it stops. Any further presence of ice and snow caused by former precipitation events is not of importance for the heating of the rain gauge (because there is nothing to detect for it).

The most important information that is needed to be detected is the process of precipitation under freezing conditions (i.e. the detection of the process itself and not its resulting state).

CN 106526711 relates to a rain, snow, dew and frost monitor which comprises a monitor shell. The upper end of the monitor shell is provided with a rain and snow sensor. The lower part in the monitor shell is provided with a dew and frost sensor and a temperature and humidity sensor. The rain and snow sensor, the temperature and humidity sensor and the dew and frost sensor are electrically connected to a monitoring processor. The monitoring processor receives a rain and snow sensing capacitance value transmitted by rain and snow sensor, a temperature and humidity value detected by the temperature and humidity sensor and the dew and frost sensing capacitance value transmitted by dew and frost sensor at the same time, and compares the rain and snow sensing capacitance value, the temperature and humidity value and the dew and frost sensing capacitance value with pre-set rain and snow sensing capacitance value, temperature and humidity value and dew and frost sensing capacitance value so as to judge a weather phenomenon of rainfall, snowfall, dew or frost at present according to comparison results. The rain, snow, dew and frost monitor can monitor four weather phenomena of rainfall, snowfall, dew and frost in real time, the beginning, duration and ending times of the weather phenomena are recorded, the monitoring sensitivity is high, and the rain, snow, dew and frost monitor is convenient to use.

In CN 106526711 the frost sensor is protected from outside conditions in a housing and there is a ventilation measure in order to receive air temperature, because they want to detect frost due to air temperature conditions, while in the present invention a second wetness detection means is in thermo-conducting contact with the lower surface of the sloped thermo-conducting sheet. Heat transfer due to conduction (heat flow through material) and radiation (solar, sky or other radiative sources) is minimised down to a negligible quantity (one could say "eliminated") by this measure. Only convection is wanted in CN 106526711 for detecting frost conditions: see claim 1: " . . . the frost sensor is disposed in the lower portion of the monitoring housing . . . the lower part of the monitoring housing is provided with a gas circulation hole for ensuring free flow of gas around the frost sensor . . . "

Therefore the method of CN 106526711 cannot be used for the purpose of the present invention, because we need to see the full heat transfer synergy including the conduction synergy through all connected materials and the radiation from the sun to earth and from the earth towards the sky. CN 106526711 cannot distinguish between freezing direct precipitation (rain, snow) and freezing indirect precipitation (dew) under air temperature conditions between 0[° C.] and +4 [° C.].

Usually remote meteorological stations do not have access to the electricity grid and are therefore very limited in their energy consumption. To be able to measure accurately and regularly precipitations or wind, the stations have to manage a heating system during winter conditions (e.g. in case of freezing, snowing, hail or freezing rain).

Without a heating system, some measurements will fail: precipitation measurement (rain gauges) or wind measurements with ultrasonic anemometers.

At present there is no commercial method available for heating rain gauges in remote areas. Manufacturer of the meteorological sensors consider not using heating for the remotely installed sensors, because their energy demand is too large for using batteries or even combined battery-solar energy supplies. This results often in a lack of data or a huge effort to have enough electrical energy available on-site, what is simply not acceptable and must be solved in any way. E.g. a solar-photovoltaic powered system would need to be hugely oversized in order to provide enough energy during Winter months for heating. This oversized system (surface of photovoltaic modules) would have a direct influence on meteorological measurements if it's installed in the direct neighbourhood, which isn't conform to standards on these measurements.

Thanks to the present invention remotely installed devices can be heated in winter conditions with a minimum of energy supply (i.e. only during snow, hail and ice events) by switching a battery powered heating only if it's really necessary. This way, power failure of the whole system, due to emptied batteries by the heating system and the probability of data loss due to not working (frozen) devices, is minimised. There was a long felt need, which is now remedied by the present invention.

Each of the chosen sensors can be operated with low energy demand and a minimum on maintenance. The system needs to be robust (under all weather conditions) and needs to deliver only two operational states as an output: true (=freezing precipitation occurs) or false (=every other condition). It can be used for other applications in which the knowledge of freezing precipitation is important but where there is no "unlimited" power supply at the location of operation. It can also save a lot of energy for electrical heating applications for internal built roof drain systems that could be damaged by ice without heating.

SUMMARY OF THE INVENTION

The present invention relates to a freezing precipitation detection device (10) comprising:
at least one first wetness detection means (1) in thermo-conducting contact with the upper (3A) surface of a sloped thermo-conducting sheet (3), at least one second wetness detection means (2) in thermo-conducting contact with the lower (3B) surface of said sloped thermo-conducting sheet (3), at least one surface temperature detection means (4) in thermo-conducting contact with said sloped thermo-conducting sheet (3), at least one processor (5) configured to receive at least one first signal (11;11A,11B,11C) from the first wetness detection means (1) and from the second wetness detection means (2) and from the surface temperature detection means (4), analyzing said first signal (11;11A,11B,11C) and determining the presence or the absence of a directed freezing precipitation on the surface of the sloped thermo-conducting sheet (3), at least one first apparatus (7) for external power relay adapted for receiving at least a second signal (12) from the processor (5), said signal (12) being indicative of a recommended action by said first apparatus (7), said action being either adapted for permitting to provide power or not to provide power to at least one third apparatus (8) (e.g. a rain gauge), at least one second apparatus (6) for power supply being connected to said processor (5) and also to said first apparatus (7), wherein said second apparatus (6) for power supply is not actively heating said sensing devices (thermo-conducting sheet (3), first wetness detection means (1), second wetness detection means (2) and the surface temperature detection means (4)),
said first apparatus (7) permitting to provide power to said third apparatus (8) only when said surface temperature detection means (4) detects a temperature less or equal to a determined threshold and the first and second wetness detection means (1;2) detect the presence of a freezing or non-freezing (fluid) precipitation.

Preferably, said determined threshold is less or equal to an air (ambient) temperature of +4° C., +3° C., +2° C., +1° C., 0° C., −1° C., −2° C., −3° C., −4° C., more preferably equal or below 0° C., most preferably 0° C.

The surface temperature is measured by the surface temperature detection means (4) at the surface of the sloped thermo-conducting sheet (3). The surface temperature is depending on convection (surrounding air flow), net radiation (sun towards earth and earth towards the sky) and conduction (through the material of the sheet).

Preferably, said determined threshold is adjustable by the processor (5).

Preferably, the thermo-conducting sheet (3) is coated with a wide range spectral irradiance sensitive coating.

The first wetness detection means (1) measures a first signal (i.e. a first value (11A)) and the second wetness detection means (2) measures a second signal (i.e. a second value (11B)), the differentiation of both signals i.e. of the upper wetness surface (3A) and lower wetness surface (3B) allows to distinguish between directed and indirect precipitations.

Preferably, the processor (5) is receiving the first signal (11A) of the first wetness detection means (1) and the second signal (11B) of the second wetness detection means (2) and the third signal (11C) of the surface temperature detection means (4) and said processor (5) makes a calculation ending to a specific mathematical value which will have the consequence of sending a signal (12) to the first apparatus (7) permitting to switch on or switch off said first apparatus (7) and sending power or not sending power to the third apparatus (8).

Preferably, at least one protective wall (13A,13B,13C) surrounds the sloped thermo-conducting sheet (3).

Preferably, the third apparatus (8) is a rain gauge or an internal roof drain provided with a heating system.

Preferably, the recommended action is heating or not heating the third apparatus (8).

Preferably, said second apparatus (6) comprises a photovoltaic module ensuring that the second apparatus (6) remains charged.

Preferably, the at least one first signal (11;11A,11B,11C) is composed of three different signals (11A,11B,11C).

Preferably, said first apparatus (7) reacts immediately once a freezing precipitation is detected. Preferably, the precipitation is a freezing or a fluid (rain) precipitation.

Preferably, the freezing precipitation is a directed precipitation (snow, freezing rain, hail) or an indirect (fog, dew) freezing precipitation.

The present invention relates also to the use of the device for heating a rain gauge.

The present invention relates also to the use of the device for heating an internal roof drain. The present invention relates also to the use of the device for warning motorways vehicle drivers about freezing precipitations.

The present invention relates also to a method for detecting a freezing precipitation comprising the successive steps of:
  determining the wetness condition on the upper (3A) surface of a sloped thermo-conducting sheet (3),
  determining the wetness condition on the lower (3B) surface of said sloped thermo-conducting sheet (3),
  determining the surface temperature on said sloped thermo-conducting sheet (3), processing via a processor (5) at least one first signal (11;11A,11B,11C) received from a first wetness detection means (1) and from a second wetness detection means (2) and from a surface temperature detection means (4),
  analysing said first signal (11;11A,11B,11C) via said processor (5),
  determining the presence or the absence of a freezing precipitation on the surface of the sloped thermo-conducting sheet (3) via said processor (5),
  sending a second signal (12) to a first apparatus (7) for external power relay, which receives said second signal (12) from the processor (5), said signal being indicative of a recommended action by said first apparatus (7), said action being either permitting to provide power or not to provide power to at least one third apparatus (8),
  permitting to provide power from said first apparatus (7) to said third apparatus (8) only when said surface temperature detection means (4) detects a temperature less or equal to a determined threshold and the first and second wetness detection means (1;2) detect the presence of a freezing precipitation and without direct active heating from a second apparatus (6) for power supply to said thermo-conducting sheet (3).

The processor (5) of the present invention is continuously reading and logging the signals (11A, 11B,11C).

The second apparatus (6) for power supply (battery) is the main power source for all apparatus.

Photovoltaic modules (PV-modules) ensure, that the battery remains continuously charged. A charge controller keeps the battery in a safe state (no overcharge or deep-discharge) and gives warnings, before a critical state will be reached. The processor (5) or data logger/switch apparatus runs a control algorithm, that monitors and logs continuously the measurement values of the signals (11A, 11B, 11C).

If a freezing precipitation event is detected, then processor (5) sends a switch on signal to the first apparatus (7) that switches on the battery power to the electrical heating system of the apparatus (8). In any other case, the electrical heating remains disconnected from the second apparatus (6).

The principle of the present invention is a combination of a differential wetness detection with a surface temperature measurement.

The differential wetness detection is a method, which is not known to be applied yet, because there wasn't any reason to do so. The purpose of a wetness detector is the identification of wetness occurrences on surfaces like windscreens of cars in order to switch whippers, leafs of plants in order to monitor the growing, floors in order to detect leakage, etc.

The differential measurement of wetness in the present invention is used to distinguish between directed and indirect precipitation.

A directed freezing precipitation (event which is wished to be detected in order to enable precipitation measurements with a third apparatus (8)) is defined as being snow, freezing rain and hail, which can be considered as directed precipitations falling from the sky towards the ground. In this context the term "directed" doesn't refer to only one preferred direction, but to a combination of all vectors that have their origin from above and head towards the ground.

An indirect precipitation (event which is not wished to be measured with a third apparatus (8)) is defined as being dew and fog, which can be considered as indirect precipitations because the vectors that describe the movement of those particles can go in any arbitrary direction. Especially dew which is produced by the condensation of water content in the ambient air can occur on surfaces with arbitrary orientation no matter if they face towards the sky or towards the ground. It's only the temperature difference between the colder surface and the warmer ambient air that causes dew on it. Sometimes water is condensing already in the air and the resulting small droplets form a fog that encloses all surfaces facing in any direction. The event of an indirect precipitation occurs more often than a directed precipitation in middle Europe. This is not desired to be measured with a rain gauge because the amount of precipitation is rather small and lies below the detection limit of rain gauges (typically 0.1 [mm/m$^2$]. Therefore, during these indirect precipitation events we don't need a fully operational rain gauge and for this reason no active heating is needed.

The wetness signal due to an indirect precipitation (dew or fog) will be eliminated by the device by the difference between the wetness signal (11A) and the wetness signal (11B).

Directed Freezing Precipitation Detection (DFPD) Device:

A thermo-conducting sheet (3) is sloped in an angle between 45 and 60 degrees from the horizontal orientation in order to prevent long-term precipitation accumulation on it. The colour of the surface is black in order to reach a maximum of the net irradiance due to absorption and emission (depending on sky conditions positive or negative). During a positive net irradiance period, the layer of snow or ice can melt when the precipitation stops. During clear nights, the emission of irradiance from the thermo-conducting surface towards the sky causes colder surface temperature than the ambient temperature, which is similar to the receptive parts of the measurement devices (rain gauges). In this case, dew can occur on both sides of the thermo-conducting sheet and on both sides of the attached wetness sensors.

On each side of this sloped surface (upper side 3A, lower side 3B) there is a wetness detection sensor with a directed heat conducting contact to it, installed using thermo-conductive glue or any other attaching means. These two sensors need to have a low thermal capacity and a fair thermal conductivity.

Additionally, there is a surface temperature sensor (4) installed on the down-facing side (3B) of the thermo-conducting sheet (3). In order to protect the down-facing parts from precipitation that move horizontally there are protective walls on the surroundings of the thermo-conducting sheet. They can be made of the same material or of different material.

The differentiation of both signals wetness upper (3A) and lower (3B) surface allows distinguishing between directed and indirect precipitations. If the surface temperature is equal or lower to 0° C. freezing of the wet surface is expected or there is already snow or ice staying on the surface. The slope of the surface should allow a certain stay-time after the event of precipitation. A slope value around 45 degrees showed good results. Preferably, the slope has an angle between 30° and 60°.

An algorithm is running on a processor (also called controller).

power supply system in almost any location on earth. Table 1 shows the energy saving potential of a heating system with installed and operational freezing precipitation system against the conventional temperature controlled heating system as it can be already ordered for an unlimited energy supply (electricity grid connection). All relative figures are estimations of typical magnitudes for an installation in middle Europe. For more a specific absolute estimation these figures can be replaced by results of the analysis of statistical meteorological data. The observed period related

TABLE 1 comparative table:
Energy savings in using the device of present invention compared with
an apparatus in operation without the device of the present invention.

| Temperature in ° C. | Device of the present invention used: Yes** or No* | precipitation time (relative) % | no precipitation time (relative) % | heating time (relative) % | heating duty cycle % | energy requirement (relative) % | energy saving ratio with freezing precipitation detection device of present invention in operation % |
|---|---|---|---|---|---|---|---|
| +6 | Yes | 40 | 60 | 0 | 0 | 0 | 0 |
| +6 | No | 40 | 60 | 0 | 0 | 0 | |
| +4 | Yes | 30 | 70 | 0 | 0 | 0 | 100 |
| +4 | No | 30 | 70 | 100 | 25 | 25 | |
| +2 | Yes | 25 | 75 | 0 | 30 | 0 | 100 |
| +2 | No | 25 | 75 | 100 | 30 | 30 | |
| +1 | Yes | 25 | 75 | 0 | 30 | 0 | 100 |
| +1 | No | 25 | 75 | 100 | 30 | 30 | |
| 0 | Yes | 20 | 80 | 20 | 40 | 8.1 | 79.8 |
| 0 | No | 20 | 80 | 100 | 40 | 40 | |
| −2 | Yes | 15 | 85 | 15 | 60 | 9.1 | 84.8 |
| −2 | No | 15 | 85 | 100 | 60 | 60 | |
| −4 | Yes | 10 | 90 | 10 | 80 | 8.1 | 89.9 |
| −4 | No | 10 | 90 | 100 | 80 | 80 | |
| −6 | Yes | 5 | 95 | 5 | 100 | 5.1 | 94.9 |
| −6 | No | 5 | 95 | 100 | 100 | 100 | |

Figure 5:
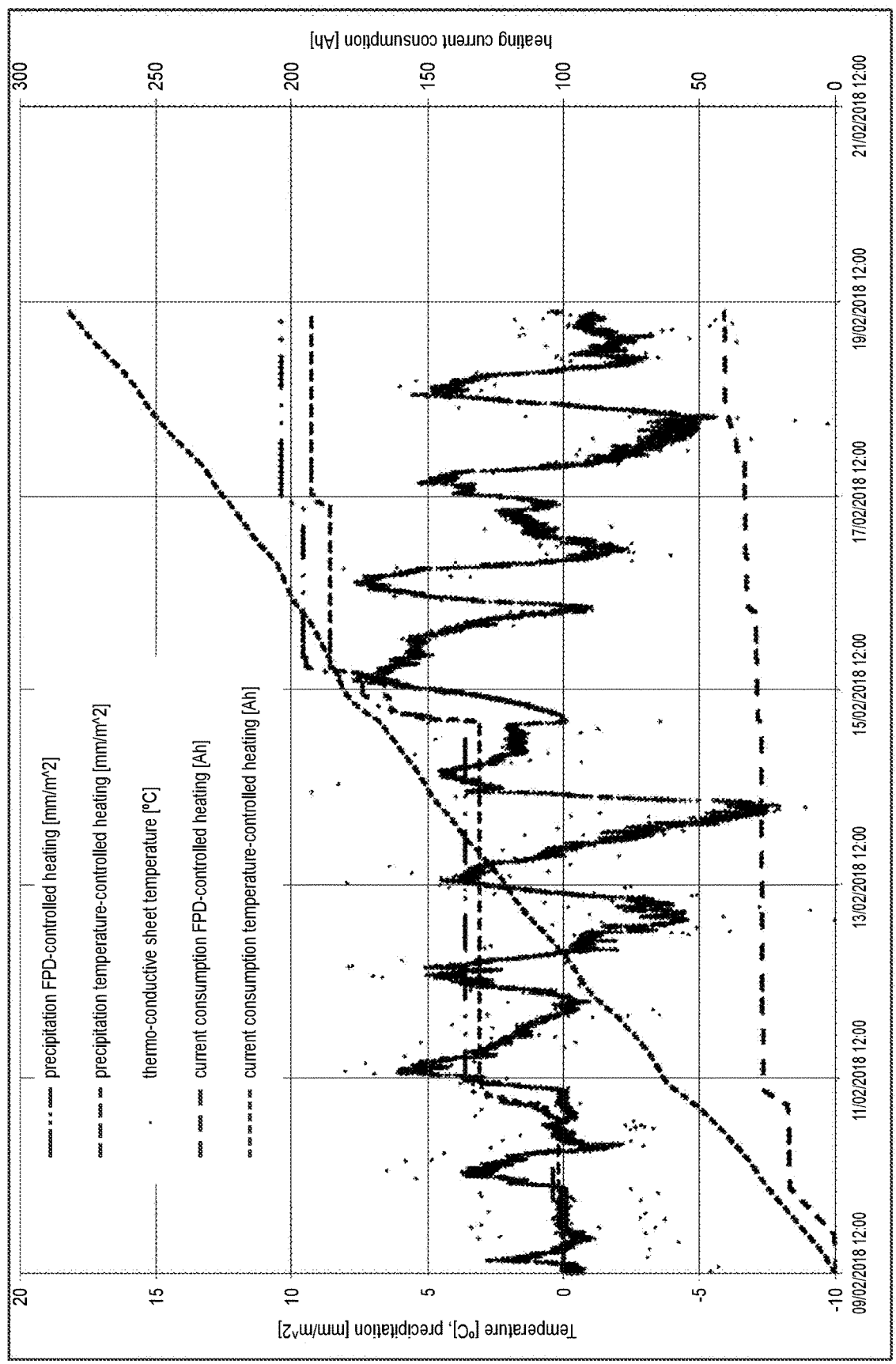
FIG. 5: the graph is showing the measurements of the two identical heated rain gauges during snow conditions over 10 days in February 2018. The dot-dot-dashed curve shows the accumulated precipitation values [mm/m$^2$] of the FPD controlled heating of the rain gauge, the dashed curve with the same shape below shows the precipitation values [mm/m$^2$] of the temperature controlled heating of the rain gauge. Both curve have a similar shape and the values are in the same range within an acceptable tolerance for snow (10.4 [mm/m$^2$] FPD controlled and 9.2 [mm/m$^2$] temperature controlled). The small dashed curve shows the electricity consumption [Ah] of the temperature controlled heating, which results in 281.8 [Ah] at the end of the measurement period. The large dashed curve shows the electricity consumption of the FPD controlled heating, which results in 40.8 [Ah] at the end of the measurement period. Over the measurement period of 10 days the FPD controlled system was about 7 times more energy efficient compared to the temperature controlled system
Figure 6:
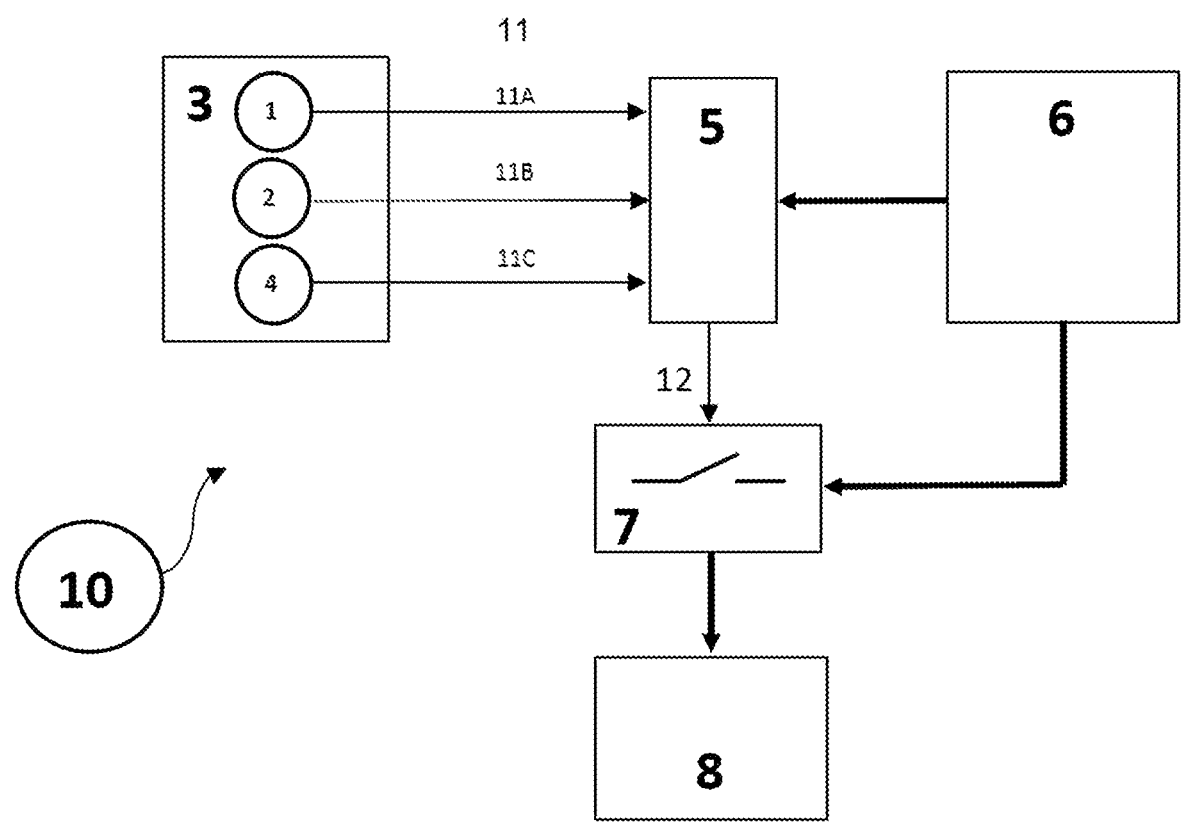
FIG. 6 is a schematic representation of the device (10) of the present invention and shows: the first wetness detection means (1) of FIG. 2, and the second wetness detection means (2) of FIG. 2 and the surface temperature detection means (4) of FIG. 2 in contact with a sheet (3). Each of the detection means (1;2;4) sends a signal (11A;11B;11C), i.e. three different signals are sent to a processor (5) (also called data logger/switch unit) which analyzes the signals (11A, 11B,11C) and determines the presence or the absence of a freezing precipitation on the surface of the sloped thermo-conducting sheet (3), one first apparatus (7) for external power relay receives a second signal (12) from the processor (5), said signal (12) being indicative of a recommended action by said first apparatus (7), said action being either permitting to provide power or not to provide power to one third apparatus (8). The second apparatus (6) for power supply (photovoltaic modules charge a controller battery) is connected to the processor (5) and also to the first apparatus (7) (also called a switch battery power), the first apparatus (7) permitting to provide power to said third apparatus (8) (also called a rain gauge comprising an electrical heating system) only when said surface temperature detection means (4) detects a temperature less or equal to a determined threshold and the first and second wetness detection means (1;2) detect the presence of a precipitation.
Figure 7:
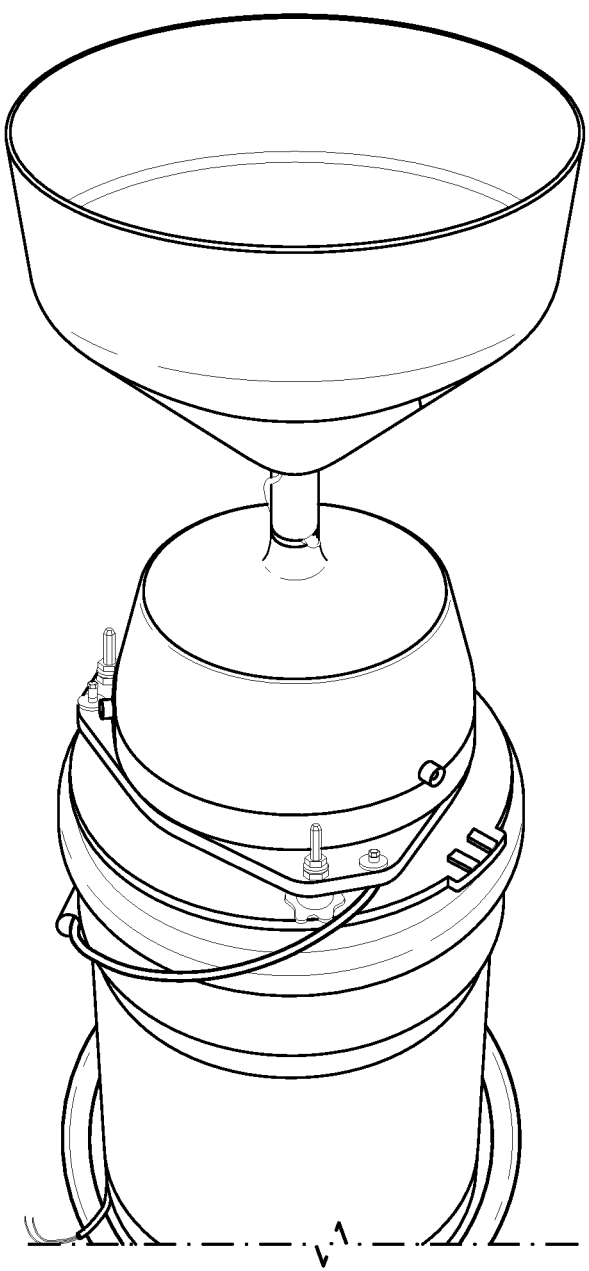
FIG. 7 is a photograph of a heated rain gauge (third apparatus (8)).
Figure 8:
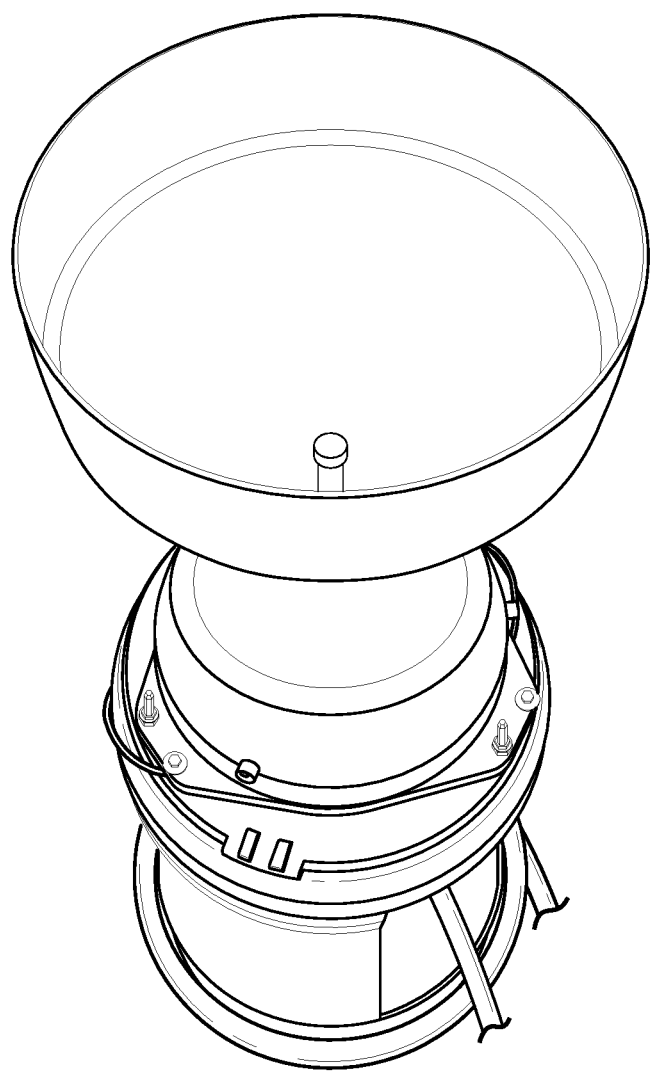
FIG. 8 is another photograph of a heated rain gauge (third apparatus (8)).
Figure 9:
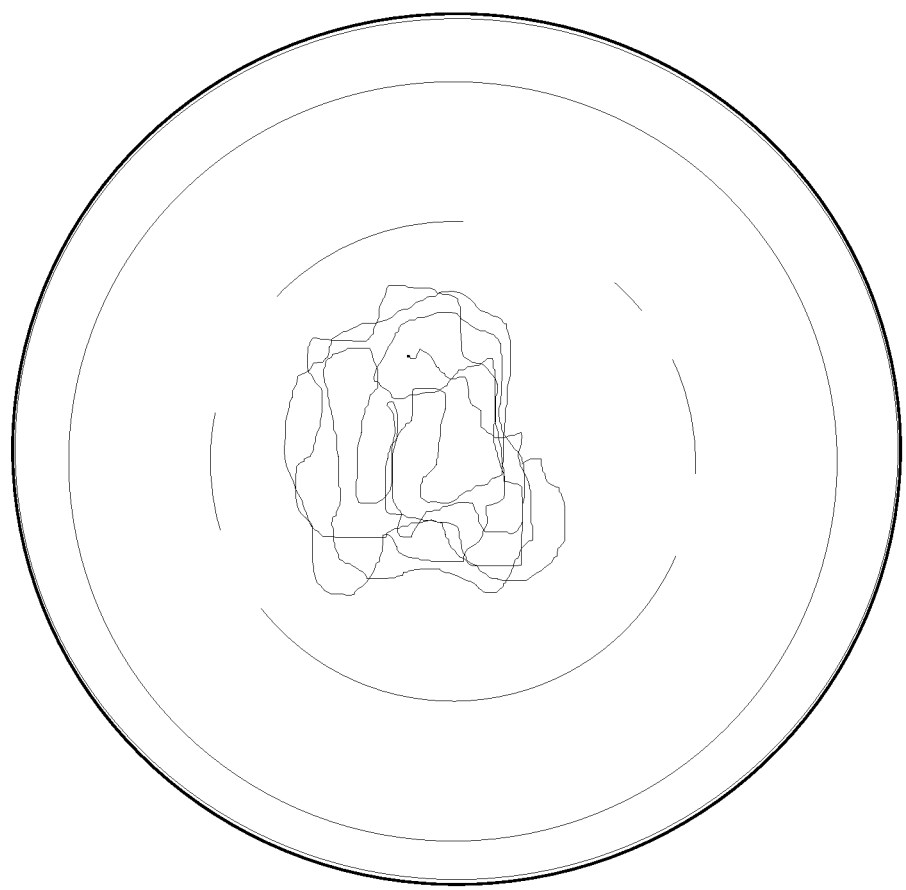
FIG. 9 is a photograph of a first type of a non-heated rain gauge (third apparatus (8)) containing snow.
Figure 10:
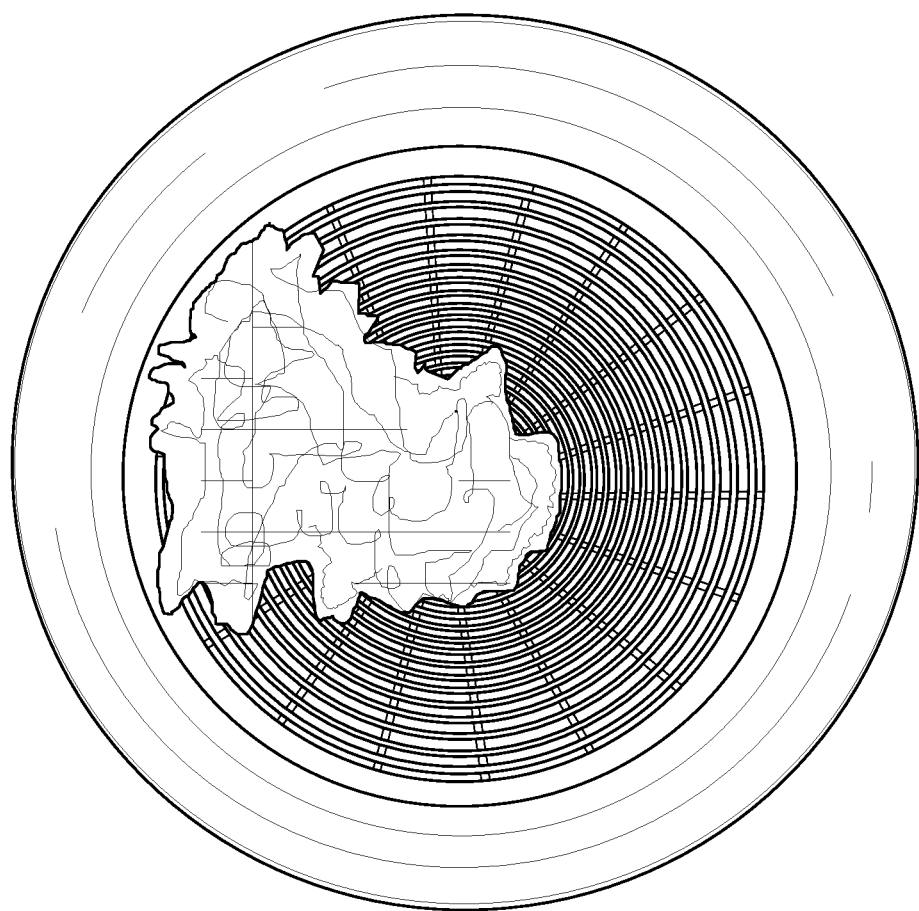
FIG. 10 is a photograph of a second type of a non-heated rain gauge (third apparatus (8)) containing snow.

*No (prior art): means that the freezing precipitation device of the present invention is not installed on the apparatus. Only apparatus (8) (rain gauge with heating device incorporated) operates with an apparatus (6) (battery) directly connected to the apparatus (8).
**Yes: means that the freezing precipitation device (10) of the present invention is installed (i.e. the present invention: apparatus 1 to 8 of FIG. 5 are installed).

At an air temperature comprised between +1° C. and +4° C., the prior art rain gauge (8) operates all the time (no energy saving—see column 5 "heating time"), while the rain gauge (8) of the present invention (see FIG. 5) does not operate because there is no freezing precipitation (energy saving modus—see column 5).

At an air temperature comprised between −6° C. and 0° C., the prior art rain gauge (8) operates all the time (no energy saving—see column 5 "heating time"), while the rain gauge (8) of the present invention (see FIG. 5) operates only during freezing precipitation time (energy saving modus—see column 5).

Therefore, with the freezing precipitation device (10) of the present invention, energy savings can be made and a battery powered system is possible, wherein the life duration of the battery (6) is much increased.

Energy Saving Estimation:

Due to a high rate of energy savings the present invention allows to install battery powered heating systems for rain gauges in remote area and operate them with a low rate on power failure (due to empty battery). It is obvious, that the installation of a battery powered energy system that guarantees a 100% fail-safe power supply is not possible due to unpredictable weather conditions. However, statistical weather data analysis allows to estimate a good balanced to the table 1 is assumed during the late autumn, winter and early spring months, when freezing precipitation can occur. However, the device of the present invention can be left in operation during the complete year, if wished.

Table 1 relates to a table estimation of energy saving potential with the operation of the directed freezing precipitation detection (DFPD) device on an electrical heated rain gauge.

Column 1 shows the air temperature in degrees Celsius.

Colum 2 indicates whether the rain gauge is equipped with the freezing precipitation detection device (Yes) or not (No).

Column 3 shows the precipitation period relative to the observed time period when the temperature value of column 1 is present.

Column 4 shows the no precipitation period relative to the observed time period when the temperature value of column 1 is present.

Column 5 shows the heating time related to the temperature value in column 1 (for both systems Yes and No) and (only with DFPD installed, column 2 "yes") the detected freezing precipitation during the period in column 3.

Column 6 shows the duty cycle of the heating system assumed. This value represents the switch on time of the heating system in relation to the temperature value in column 1. For a specific heating system these values should be replaced with the specific figures (could be provided by the manufacturer).

Column 7 shows the relative energy requirement in relation to the heating time in column 5 and the duty cycle in column 6.

Column 8 shows the relative energy savings of the heating system with an operational freezing precipitation system installed against the conventional only temperature controlled system (empty box).

Resume of the energy saving estimation. It is clear that the savings are higher the longer the periods without freezing precipitations are. The savings can be 100% or 0% depending on the period observed and the share of precipitation time during this period. For example, one day with 24 hours continuous precipitation with a constant air temperature around 0° C. won't allow any energy saving compared to a conventional temperature controlled system, therefore the energy saving is equal to 0%. Is the next day without any precipitation and the same air temperature, then the energy saving rate would amount to about 50%. This energy saving which is provided by the present invention makes it possible to install the third apparatus (8) (i.e. battery powered heating rain gauges) in remote areas.

TABLE 2 comparative table.
Comparison of working or non-working measurements between a device comprising apparatus 1 to 8 of the present invention and a device comprising only apparatus 8 alone.

| Temperature in ° Celsius | Freezing precipitation detection device of the present invention installed: Yes** or No* | Measuring of the precipitation in a rain gauge - functional: Yes or No |
|---|---|---|
| +6 | Yes | YES |
| +6 | No | YES |
| +5 | Yes | YES |
| +5 | No | YES |
| +4 | Yes | YES |
| +4 | No | YES or NO, depends on fluid or frozen condition of precipitation |
| +3 | Yes | YES |
| +3 | No | YES or NO, depends on fluid or frozen condition of precipitation |
| +2 | Yes | YES |
| +2 | No | YES or NO, depends on fluid or frozen condition of precipitation |
| +1 | Yes | YES |
| +1 | No | YES or NO, depends on fluid or frozen condition of precipitation |
| 0 | Yes | YES |
| 0 | No | NO |
| −1 | Yes | YES |
| −1 | No | NO |
| −2 | Yes | YES |
| −2 | No | NO |
| −3 | Yes | YES |
| −3 | No | NO |
| −4 | Yes | YES |
| −4 | No | NO |
| −5 | Yes | YES |
| −5 | No | NO |
| −6 | Yes | YES |
| −6 | No | NO |

*No: means that the freezing precipitation device of the present invention is not installed on the apparatus. Apparatus 1 to 7 are not installed. Only apparatus (8) (rain gauge) operates alone.
**Yes: means that the freezing precipitation device (10) of the present invention is installed (i.e. the present invention: apparatus 1 to 8 of FIG. 5 are installed).

Table 2 shows the difference between a heated rain gauge (8) and a non-heated rain gauge (8) if it receives freezing precipitations and if they are operated at the same location. At an ambient air temperature equal or below 0° C., the non-heated rain gauge (8) does not operate because it is frozen, while the heated rain gauge (8) of the present invention operates well because it is heated and therefore frozen precipitations (snow, hail) will change their physical state into liquid precipitations which can be measured by the rain gauge (8).

At an ambient air temperature comprised between +1° C. and +4° C., the non-heated rain gauge (8) does not operate during frozen conditions of precipitation but operates appropriately during fluid/liquid conditions of precipitations (rain), while the heated rain gauge (8) of the present invention operates well all the time because it is heated and therefore frozen precipitations (snow) will change their physical state into liquid precipitations which can be measured by the rain gauge (8).

At an ambient air temperature equal to or above +5° C., the non-heated rain gauge (8) operates as good as the heated rain gauge (8) of the present invention because liquid precipitations (rain) can be measured by the rain gauge (8).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Figure 1:
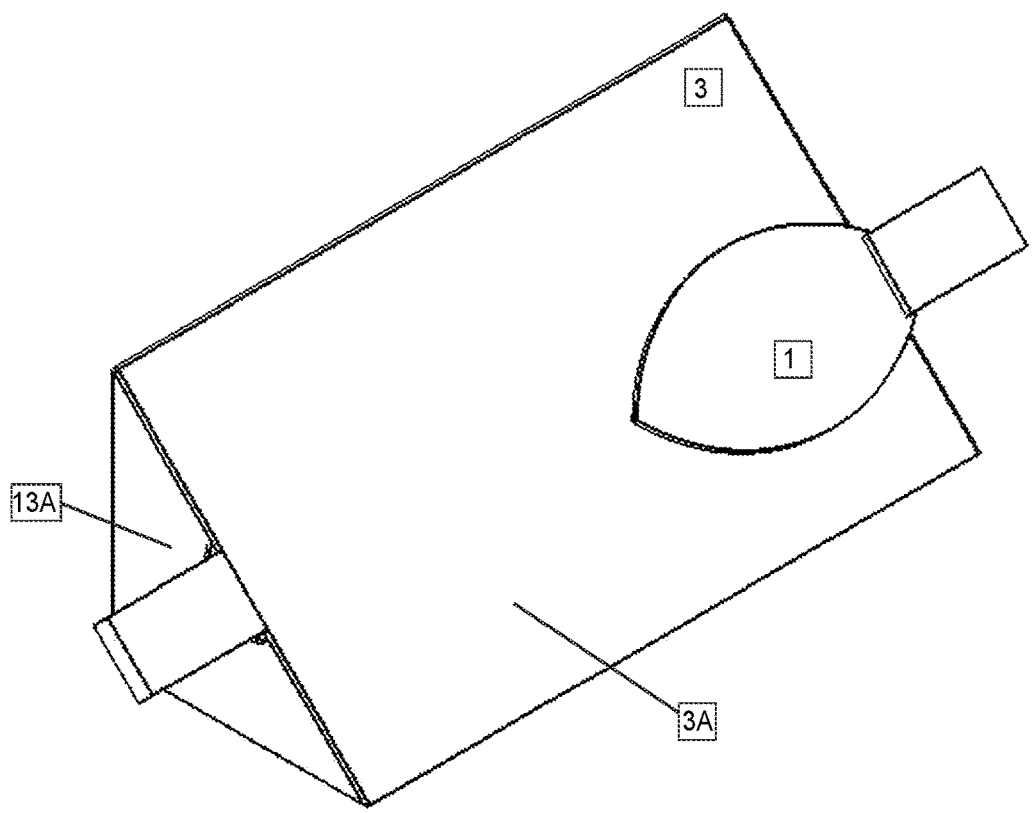
FIG. 1 shows: one wetness detection means (1) in thermo-conducting contact with the upper (3A) surface of a sloped thermo-conducting sheet (3). One protective wall (13A) surrounds the sloped thermo-conducting sheet (3).
Figure 2:
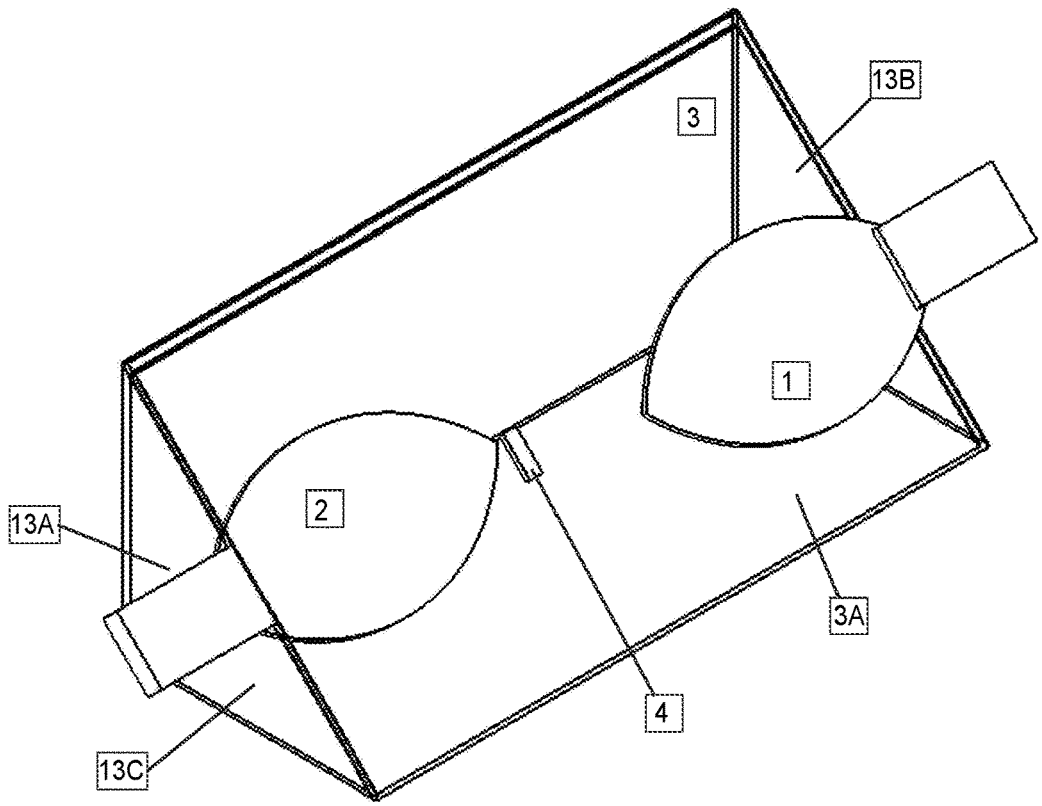
FIG. 2 shows: one first wetness detection means (1) in thermo-conducting contact with the upper (3A) surface of a sloped thermo-conducting sheet (3), and one second wetness detection means (2) in thermo-conducting contact with the lower (3B) surface of said sloped thermo-conducting sheet (3), and one surface temperature detection means (4) in thermo-conducting contact with said sloped thermo-conducting sheet (3). One protective wall (13A,13B,13C) surrounds the sloped thermo-conducting sheet (3).
Figure 3:
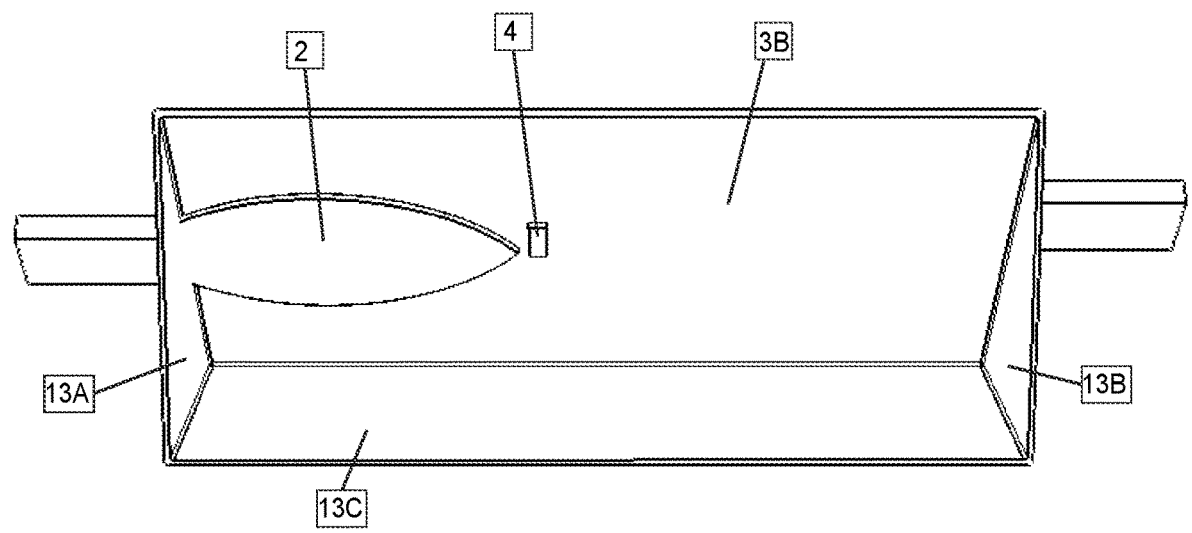
FIG. 3 shows: one second wetness detection means (2) in thermo-conducting contact with the lower (3B) surface of said sloped thermo-conducting sheet (3), and one surface temperature detection means (4) in thermo-conducting contact with said sloped thermo-conducting sheet (3). One protective wall (13A,13B,13C) surrounds the sloped thermo-conducting sheet (3).
Figure 4:
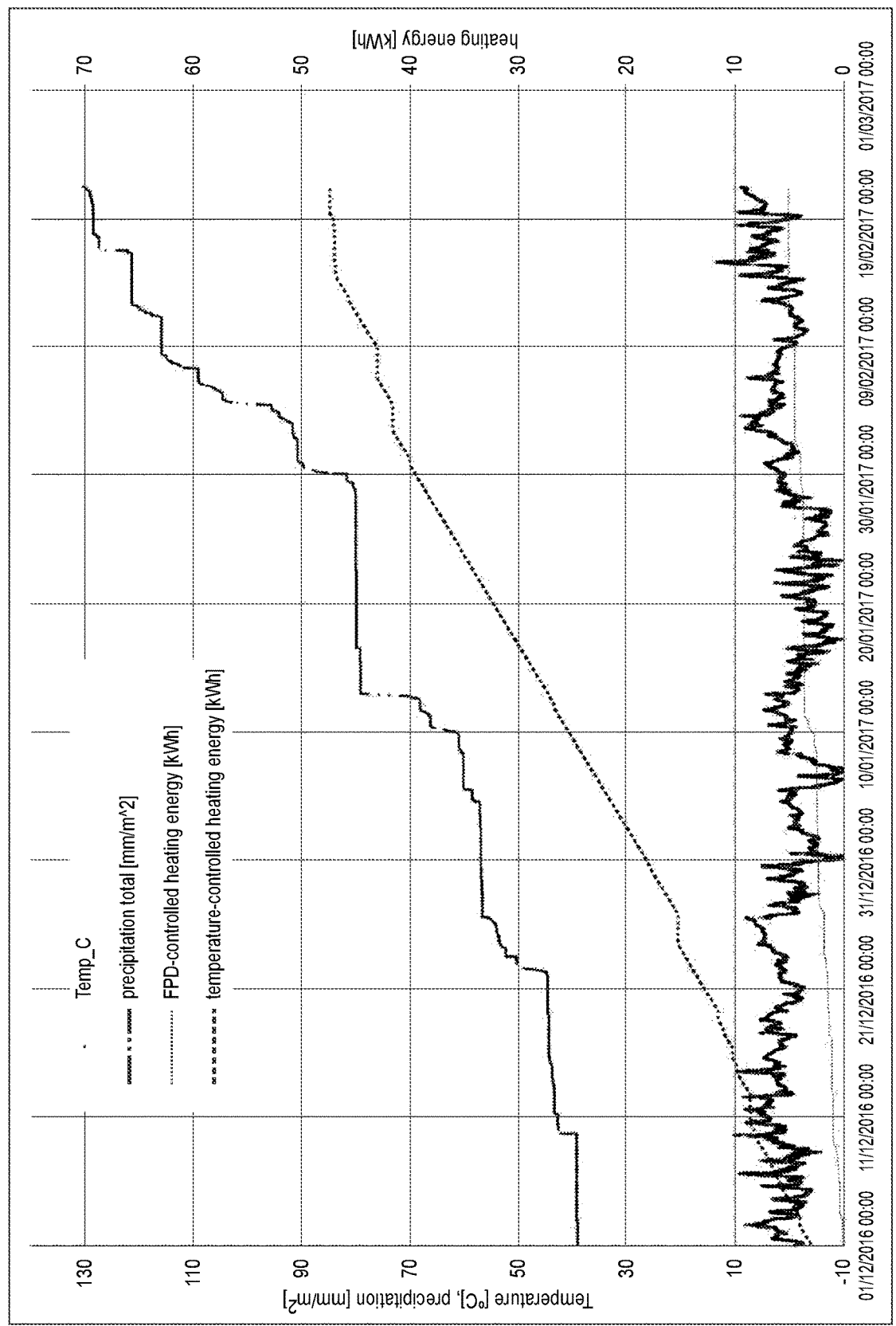
FIG. 4: The graph shows the rain gauge measurements of a Directed Freezing Precipitation Detection (DFPD) controlled heating [kWh] (dashed curve) vs. estimated heating energy of a virtual temperature controlled heating (dotted curve). The system is installed on a meteorological station. Due to the limitation of electric energy on site, it is not possible to run a real temperature controlled heating in parallel (not even alone). The estimated switch-on temperature for the virtual heating is equal or less than +4° C. It can be seen, that at the end of the 50 days measurement period, the energy saving with the DFPD controlled heating is about a factor 10 (47.3 [kWh] estimated value for temperature controlled vs. 5.0 [kWh] measured value for DFPD controlled heating). The dot-dot-dashed curve shows the accumulated precipitation over the measurement period, 130 [mm/m$^2$] at the end. It can be seen, that the measurement was also functional during freezing precipitation conditions.

Examples for the proof of functionality of the Directed Freezing Precipitation Detection (DFPD) system operated on two different sites under real outdoor conditions:

The measurements are shown in FIG. 4 and FIG. 5 of actively heated rain gauges with our Directed Freezing Precipitation Detection (FPD) system in a field application (Meteorological station in Roodt-Ell, Luxembourg) and on a test site at LIST (Luxembourg, Belvaux site).

FIG. 4 shows measurements taken at the meteorological station in Roodt-Ell, Luxembourg. This particular application on the remote site in Roodt-Ell was the main driver for our invention: A fail-safe freezing precipitation detection method that runs with a similar very small energy demand as common passive meteorological sensors.

FIG. 5 shows measurements taken at the Luxembourg Institute of Science and Technology (LIST) site, Belvaux, Luxembourg: Installation of two identical heated rain gauges next to each other.

The heating control of one rain gauge is done with the usual temperature control system; the other is controlled by our Directed Freezing Precipitation Detection (DFPD) system. In this application, the DFPD sensing devices (3), (1), (2) and (4) could not be installed in an optimal way for some specific reason. However, it was possible to demonstrate the functionality and efficiency of the DFPD controlled heating compared with the usual temperature controlled heating. The power supply of both systems was connected to the electricity grid. Therefore both systems could be operated in parallel without any limitation in electric energy (like in remote sites without electricity grid connection).

CONCLUSION

As the DFPD heating control is a passive system (no active heating for the sensing elements necessary), which can be operated with a typical data logger for meteorological stations (3 signal inputs and one digital output channel is necessary). The DFPD control itself has only a negligible energy demand to be functional. The range is similar to other passive sensors, which are typically connected to the data logger. The two outdoor tests under real operating conditions proved that a significant reduction of heating energy demand can be reached. Consecutively the present invention allows installing a heating system in remote sites, where no conventional electricity supply is available (e.g. battery powered). Even on sites, where unlimited electricity supply for heating is available, it would make sense to install such a control system in order to save energy.

The invention claimed is:

1. A directed freezing precipitation detection device comprising:
   a first wetness detector in thermo-conducting contact with an upper surface of a sloped thermo-conducting sheet coated with a spectral irradiance sensitive coating for reaching a maximum of a net irradiance due to absorption and emission;
   a second wetness detector in thermo-conducting contact with a lower surface of said sloped thermo-conducting sheet;
   a surface temperature detector in thermo-conducting contact with said sloped thermo-conducting sheet;
   at least one processor configured to receive at least one first signal representing a first wetness measurement from the first wetness detector, a second wetness measurement from the second wetness detector, and a third measurement from the surface temperature detector, analyze the first wetness measurement, the second wetness measurement, and the third measurement of the at least one first signal to determine a presence or an absence of a freezing precipitation on the upper surface of the sloped thermo-conducting sheet, and generate a second signal based on analysis of the first wetness measurement, the second wetness measurement, and the third measurement of the at least one first signal;
   a first apparatus for external power relay configured to receive the second signal from the at least one processor, said second signal being indicative of a recommended action by said first apparatus, said recommended action being one of: (i) providing power and (ii) not providing power to a rain gauge or an internal roof drain; and
   a second apparatus configured to connect a power supply to said at least one processor and said first apparatus, wherein said second apparatus is not actively heating said sloped thermo-conducting sheet, and
   said first apparatus provides power to the rain gauge or the internal roof drain only when a temperature less than or equal to a determined threshold is detected by said surface temperature detector and the presence of the freezing precipitation is detected by the first wetness detector and second wetness detector using the sloped thermo-conducting sheet.

2. The device of claim 1, wherein at least one protective wall surrounds the sloped thermo-conducting sheet.

3. The device of claim 1, wherein the recommended action is heating or not heating the rain gauge or the internal roof drain.

4. The device of claim 1, wherein said first apparatus reacts immediately once the freezing precipitation is detected.

5. The device of claim 1, wherein said determined threshold is less than or equal to 0° C.

6. The device of claim 5, wherein said determined threshold is adjustable by the at least one processor.

7. The device of claim 1, wherein said second apparatus comprises a photovoltaic module ensuring that the second apparatus remains charged.

8. A method of heating a rain gauge, the method comprising:
   utilizing the device of claim 7.

9. A method of heating an internal roof drain, the method comprising:
   utilizing the device of claim 7.

10. A method of warning motorways vehicle drivers about freezing precipitations, the method comprising:
    utilizing the device of claim 7.

11. A method for detecting a directed freezing precipitation, the method comprising:
    determining a wetness condition on an upper surface of a sloped thermo-conducting sheet coated with a spectral irradiance sensitive coating to reach a maximum of a net irradiance due to absorption and emission;
    determining a wetness condition on a lower surface of said sloped thermo-conducting sheet;
    determining a surface temperature on said sloped thermo-conducting sheet;
    processing, via a processor, at least one first signal including a first measurement by a first wetness detector, a second measurement by a second wetness detector, and a third measurement from a surface temperature detector;
    analyzing said at least one first signal via said processor;
    determining a presence or an absence of a freezing precipitation on the upper surface of the sloped thermo-conducting sheet via said processor, based on analysis of the at least one first signal;
    generating, by the processor, a power signal based on analysis of the first wetness measurement, the second wetness measurement, and the third measurement of the at least one first signal;
    sending the power signal from the processor to a first apparatus for external power relay, the first apparatus receiving said power signal from the processor, said power signal being indicative of a recommended action by said first apparatus, said recommended action being one of: (i) providing power or (ii) not providing power to a rain gauge or an internal roof drain provided with a heating system; and
    providing power from said first apparatus to the rain gauge or internal roof drain only when said surface temperature detector detects a temperature less than or equal to a determined threshold and the first and second wetness detectors detect the presence of the freezing precipitation and without active heating from a second apparatus configured to connect a power supply to the processor.

* * * * *